No. 768,370. PATENTED AUG. 23, 1904.
G. W. JACKSON.
DOORWAY AND DOOR FOR BEEHIVES.
APPLICATION FILED FEB. 25, 1904.
NO MODEL.
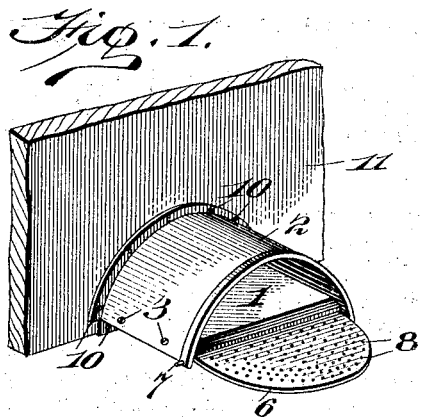
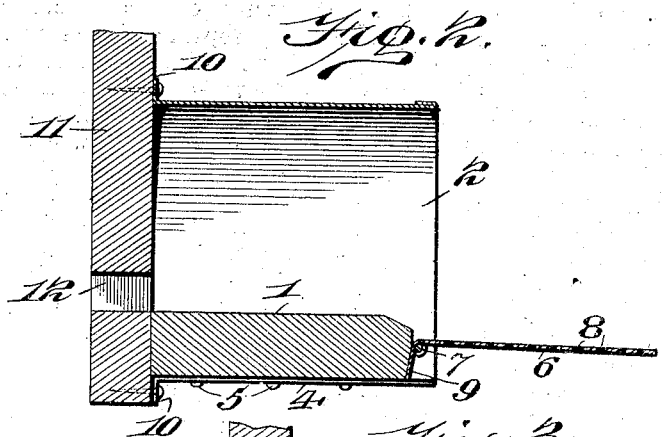
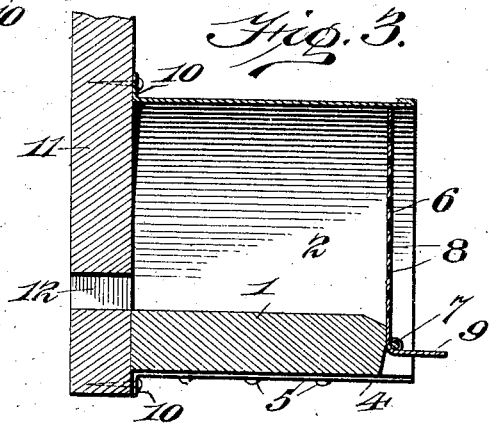
Witnesses
H. G. Dieterich
H. H. Simms
Inventor
George W. Jackson
by Knight Bros
Attorneys No. 768,370.

Patented August 23, 1904.

UNITED STATES PATENT OFFICE.

GEORGE W. JACKSON, OF POND CREEK TOWNSHIP, GREEN COUNTY, MISSOURI.

DOORWAY AND DOOR FOR BEEHIVES.

SPECIFICATION forming part of Letters Patent No. 768,370, dated August 23, 1904.

Application filed February 25, 1904. Serial No. 195,294. (No model.)

*To all whom it may concern:*

Be it known that I, GEORGE W. JACKSON, a citizen of the United States, and a resident of Pond Creek township, Green county, and State of Missouri, have invented a new and useful Doorway and Door for Beehives, of which the following is a specification.

This invention relates to doorways and doors for beehives.

It has for its object to provide a doorway and door for the hives of bees that will afford a protection to the bees in the hive against all their enemies—such as moths, millers, roaches, ants, and other insects which usually infest the beehives—that will protect the smaller and weaker swarms of bees against an invasion by a larger and stronger swarm, that will protect the bees and control them in cold weather, and that will keep all the bees at work, no room at the entrance being provided by which they may idle.

Other objects and advantages will appear in the following description and will be particularly pointed out in the claims.

In the drawings, Figure 1 is a perspective view of my invention attached to a beehive, a portion only of the hive being shown. Fig. 2 is a vertical section of the invention when in an open condition, and Fig. 3 is a vertical section of the invention when in a closed condition.

Referring more particularly to the drawings, 1 indicates a small block of wood which forms the bottom for the doorway 2, which is formed by a piece of sheet metal bent into semicylindrical shape and having its free ends secured to the free ends of the bottom 1 at 3 and extended beneath the same at 4 and again secured at 5. Mounted to close the doorway is a door 6, which is semicylindrical in shape and is hinged at its bottom edge, by means of a rod 7, to swing upwardly and fit closely within the doorway, it being provided with perforations 8 for ventilation. In its lower position the door 6 is supported approximately horizontal by a tongue 9, carried thereby and engaging with the edge of the bottom 1. The rear edge of the sheet-metal doorway and the extensions 4 are bent into attaching-flanges 10, which are secured to the outer walls of the beehive 11 around one or more of the openings 12 therein, one only being shown in the drawings.

My invention may be secured to any hive, and in applying the same all openings except those to be surrounded are closed and the flanges 10 are nailed or otherwise secured to the outer wall.

The door 6 should be closed on nights in warm weather and at all times in the cold weather, thus keeping all kinds of insects out of the hive, the holes in the door furnishing ventilation and air when the door is closed. The door being hinged, the bottom of the mouthpiece when it is opened makes a convenient place for the bees to alight when coming in loaded. The miller or moth always alights on the hive away from the entrance of the bees and then hunts for the entrance, going around and under the hive; but with all other openings closed except where this invention is attached the moth or miller will usually fail to find the entrance. However, in the event that the moth or miller should alight or get into this doorway it would be early in the evening or about dusk and in warm weather, and at that time of the day the bees are in the hive and the doorway to ward them off. The miller or moth only flies in the night-time, usually in the early part of the evening, and then only while it is warm, and when it is warm enough for the miller or moth to be out the bees are also out in great numbers and always at the entrance ready to keep out everything. This doorway gives the bees a stronghold to protect themselves against everything that may attack them, big to little, including all moths, other and stronger swarms of bees, cockroaches, ants, and other insects. This stronghold is to the bees like a fort is to an army. With this device attached the bees congregate in it and all attacks on the bees must be made through this entrance where so many guards are on duty, while on the old hives as they are now used there are many entrances and the bees are not congregated about the entrances so compactly. Not only will the bees fight off all attacks, but by going around each evening and closing up all entrances by the door of this doorway all things are shut out except air and ventilation, which comes through the holes in the doors.

In winter seasons this doorway can be filled with cloths or rags and the door shut up, so that none of the swarm will suffer from the cold weather, and so that none of the bees can come out on days when it is too cold for them to be out with safety, thus preventing a decrease in the number of the swarm by freezing to death or when out chilling down before they can fly back, thereby controlling the bees in bad weather. This doorway does not furnish enough room for the bees during the day in warm weather to lay idle at the entrance, while on the hive as used to-day the bee can lie around the entrance or on the side of the hive without being so readily detected by the bees on watch for them. Thus all of the bees are kept busy.

The bottom of the doorway is made of wood, because I have found that in cold weather the bees become chilled and unable to get back into the hive when they come out to sun on a tin or iron floor.

Having thus described my invention, what I claim as new therein, and desire to secure by Letters Patent, is the following:

1. An attachment for beehives comprising a doorway extending, when attached to the hive, from one of the walls thereof, closed at its top, bottom and sides, and provided with a door hinged at its lower edge, and means carried by the attachment and engaging a part of the doorway for supporting the door in an approximately horizontal position.

2. An attachment for beehives, comprising a doorway, having its top and sides formed from sheet metal and its bottom made of wood; and attaching-flanges formed at the rear edges of the top and sides.

3. An attachment for beehives comprising a doorway having its top and sides formed from sheet metal and its bottom made of wood, and attaching-flanges formed at the rear edges of the top and sides; and a door for the doorway hinged at its lower edge and provided with a tongue to support the door in an approximately horizontal position.

4. In a beehive, the combination of means extending from one of the outer walls thereof and forming around the entrance a doorway closed at its top bottom and sides, a perforated door hinged at its lower edge in the front of the doorway, and means for holding the door in an approximately horizontal position.

The foregoing specification signed this 17th day of February, 1904.

GEORGE W. JACKSON.

In presence of—
JASON JACKSON,
THOMAS H. GIDEON.